US012146484B2

(12) United States Patent
Mutschler et al.

(10) Patent No.: US 12,146,484 B2
(45) Date of Patent: Nov. 19, 2024

(54) REAL-TIME-CAPABLE TRAJECTORY PLANNING FOR PIVOTING-PLATE-TYPE AXIAL PISTON PUMPS WITH SYSTEMATIC CONSIDERATION OF SYSTEM LIMITATIONS

(71) Applicant: Robert Bosch GmbH, Stuttgart (DE)

(72) Inventors: Steffen Mutschler, Neu-Ulm (DE); Adrian Trachte, Stuttgart (DE); Carolina Passenberg, Rutesheim (DE); Steffen Joos, Walheim (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 17/597,493

(22) PCT Filed: Jul. 2, 2020

(86) PCT No.: PCT/EP2020/068648

§ 371 (c)(1),
(2) Date: Jan. 7, 2022

(87) PCT Pub. No.: WO2021/004879

PCT Pub. Date: Jan. 14, 2021

(65) Prior Publication Data

US 2022/0243718 A1 Aug. 4, 2022

(30) Foreign Application Priority Data

Jul. 8, 2019 (DE) ..................... 10 2019 210 003.1

(51) Int. Cl.
*F04B 49/06* (2006.01)
*F15B 13/02* (2006.01)
(Continued)

(52) U.S. Cl.
CPC .............. *F04B 49/06* (2013.01); *F15B 13/02* (2013.01); *F15B 15/20* (2013.01); *G05B 19/042* (2013.01); *G05B 2219/25312* (2013.01)

(58) Field of Classification Search
CPC ........ F03C 1/0686; F15B 13/02; F15B 15/20; H01R 13/2421; G05B 13/024;
(Continued)

(56) References Cited

U.S. PATENT DOCUMENTS

2004/0064292 A1 4/2004 Beck et al.
2011/0278129 A1* 11/2011 Gorius ................. F16D 48/066 192/85.01

(Continued)

FOREIGN PATENT DOCUMENTS

DE 10 2013 208 869 A1 11/2014
DE 10 2014 224 337 A1 6/2016

(Continued)

OTHER PUBLICATIONS

International Search Report corresponding to PCT Application No. PCT/EP2020/068648, mailed Oct. 8, 2020 (German and English language document) (5 pages).

(Continued)

*Primary Examiner* — Vincent H Tran
(74) *Attorney, Agent, or Firm* — Maginot, Moore & Beck LLP

(57) ABSTRACT

A method is for producing, for a hydraulic machine having an actuator, a setpoint-value trajectory satisfying predefined limitations in order to influence an output variable of the hydraulic machine. A trajectory of unlimited setpoint values is fed to a trajectory planning function, which produces the setpoint-value trajectory from the trajectory of unlimited setpoint values. In the trajectory planning function, the trajectory of unlimited setpoint values is differentiated at least twice in order to obtain a trajectory of unlimited setpoint values that is differentiated n times. In the trajectory planning function, at least one limitation is applied to the differentiated trajectory of unlimited setpoint values in order to obtain a differentiated trajectory of limited setpoint values. The differentiated trajectory of limited setpoint values is fed to a filter integrator chain in order to obtain the setpoint-value trajectory.

18 Claims, 3 Drawing Sheets

(51) Int. Cl.
*F15B 15/20* (2006.01)
*G05B 19/042* (2006.01)

(58) Field of Classification Search
CPC ................ G05B 13/048; G05B 19/042; G05B 2219/25312; F04B 1/295; F04B 1/324; F04B 49/002; F04B 49/06; F04B 49/065; F04B 49/12
See application file for complete search history.

(56) References Cited

U.S. PATENT DOCUMENTS

| | | | | |
|---|---|---|---|---|
| 2019/0377371 | A1* | 12/2019 | Joos | F15B 9/12 |
| 2020/0026296 | A1* | 1/2020 | Hoedt | B60W 20/11 |
| 2021/0072773 | A1* | 3/2021 | Schanzenbach | G05B 19/4155 |

FOREIGN PATENT DOCUMENTS

| | | | |
|---|---|---|---|
| DE | 10 2015 222 988 | A1 | 5/2017 |
| EP | 2 392 979 | A2 | 12/2011 |

OTHER PUBLICATIONS

Joos, S. et al., "Online-trajectory planning for state- and input-constrained linear SISO systems using a switched state variable filter," IFAC-PapersOnLine, 2017, vol. 50, No. 1, pp. 2639-2644 (6 pages).

Joos, S. et al., "Prioritization-based switched feedback control for linear SISO systems with time-varying state and input constraints," 2018 European Control Conference (ECC), Jun. 2018, 2935-2940 (6 pages).

* cited by examiner

Δp
x
I
303
302
301
304
302'
301'

REAL-TIME-CAPABLE TRAJECTORY PLANNING FOR PIVOTING-PLATE-TYPE AXIAL PISTON PUMPS WITH SYSTEMATIC CONSIDERATION OF SYSTEM LIMITATIONS

This application is a 35 U.S.C. § 371 National Stage Application of PCT/EP2020/068648, filed on Jul. 2, 2020, which claims the benefit of priority to Serial No. DE 10 2019 210 003.1, filed on Jul. 8, 2019 in Germany, the disclosures of which are incorporated herein by reference in their entirety.

The disclosure relates to a method for generating a setpoint trajectory for a hydraulic machine which satisfies predetermined limitations.

BACKGROUND

Hydraulic systems typically consist of components such as pumps and valves. These components are subject to physical limitations. For example, in the case of a solenoid valve (i.e. an electrically controllable solenoid valve), the control current of the valve and the position of the valve slider are limited. These limitations can be represented in a model as state variable and control variable limitations. For the synthesis of real-time control structures, such as controllers or pilot controllers, such as are required in particular for operation by joystick or accelerator pedal, the systematic adherence to limitations is a challenge.

One way to systematically take into account limitations in a control system is the application of model predictive regulation or control (MPC), which also makes it possible to control the hydraulic system optimally with regard to a defined quality function. However, MPC has the disadvantage that in each iteration step an optimization problem must be solved numerically during runtime. This requires either correspondingly fast and expensive (digital) hardware components or a solution approach tailored to the specific MPC problem, which represents a correspondingly high development and implementation effort.

In order to avoid these disadvantages, a flatness-based pilot control with corresponding trajectory planning can be used for the real-time control of hydraulic systems instead of an MPC. For the realization of the (nonlinear) flatness-based pilot control, (continuously differentiable) trajectories for the flat output and the time derivatives thereof are required. These trajectories must be planned in real time depending on an a priori unknown (user-specified) reference value for the variable to be controlled. For this purpose, a low-pass filter algorithm, a so-called 'state variable filter', can be used. This has the disadvantage that physical and geometric limitations cannot be systematically taken into account in the trajectory planning and therefore either an unfeasible or suboptimal, i.e. conservative, trajectory is generated.

DE 10 2018 114 047 A1 describes a method for generating a control variable trajectory for an actuator for influencing an output variable of a system, wherein a setpoint of the output variable of the system is supplied to a trajectory planning element, which generates from the setpoint a trajectory of limited input values for a filter integrator chain and a trajectory of flat target states, wherein the trajectory of limited input values and the trajectory of flat target states are supplied to a flatness-based pilot controller, which generates the control variable trajectory for the actuator, wherein in the trajectory planning at least one limitation is applied as a function of the trajectory of flat target states to generate the trajectory of restricted input values.

SUMMARY

According to the disclosure, a method for generating a setpoint trajectory which satisfies a predetermined limitation for a hydraulic machine, in particular a hydraulic pump, further in particular of a pivoting plate or bent axis design, as well as a computing unit and a computer program for the execution thereof are proposed.

The disclosure describes a general approach to real-time trajectory planning taking into account control variable limitations and state variable limitations for nonlinear single-variable systems of any order. The core of the disclosure is an advanced state variable filter for setpoints, such as the delivery pressure (differential pressure across the pump), the output of which is a setpoint trajectory and the derivatives thereof which can be realized under the existing state variable and control variable limitations. Using this trajectory and the at least n derivatives thereof, where n 2, and possibly by inversion of the model equations, a dynamic pilot control or a follow-up control can be realized, for example.

In the state variable filter, a dynamic limitation $\gamma^*$(maximum and/or minimum value) for the highest (preferably second) derivative of the setpoint trajectory is calculated in each time step for each k-th limitation and is applied to the highest derivative based on priority if this limit is exceeded or undercut. If this is not the case, the setpoint trajectory is preferably filtered via an unlimited filter dynamic, which is adjustable by the user, for example. Thus, in each time step, only model equations and a cascade of limitation elements have to be evaluated. This corresponds to real-time trajectory planning without numerical real-time optimization, taking into account the limitations of the control variables (for example control currents) and states (for example pivot angle and differential pressure across the pump).

If, by way of example, the same minimum and maximum value for the pivot angle are specified as lower and upper state limitations, these limits (or another, more highly prioritized limitation such as a minimum and maximum value for the differential pressure) will override the unlimited planning and the planning will be conducted for the specified pivot angle reference trajectory. A differential pressure reference trajectory can be specified either via the unlimited planning or, as with the pivot angle, as an upper and lower state limitation. These limitations (or another, higher-priority limitation such as a minimum or maximum permissible pivot angle) will override the unlimited planning and planning will be conducted for the specified differential pressure reference trajectory. Thus, in one approach the state variable filter allows planning for different input variables, as long as they are present as a state variable limitation or a control variable limitation.

In principle, the disclosure can be used in general for any trajectory planning problems in which the control system can be modeled as a nonlinear (input-related) single-variable system with control (rate) variable and state variable limitations. In particular, the described approach is suitable for hydraulic systems with mechanical stops, such as those that occur with valves. For example, the disclosure can be used for the pivot angle adjustment of any axial piston machines of bent axis or pivoting plate design. The angle adjustment of the axle or plate can, for example, be carried out pressure-controlled or electroproportionally. An example application is the use for vehicles with partial or full hydraulic power transmission by means of axial piston machines. In particular, the disclosure can be used for a torque-based traction drive which converts the desired torque at the wheels into a desired pressure difference and an output-side pivot angle, or for a speed-controlled traction drive which converts the desired speed into a drive-side pivot angle. Both concepts can be both controlled and—for example when using a pivot angle sensor—regulated.

The disclosure allows such a hydraulic system to be guided as quickly as possible along a given reference trajectory by means of appropriate trajectory planning while complying with state variable and control variable limitations. The reference trajectory can be specified, for example, as a pivot angle or as a differential pressure across the pump. At the same time, at all times (especially in the transients), the limitations of the hydraulic system are complied with. In particular, in addition to the control variable limitation (for example limitation of the control current), the limitation of the system states (for example the valve slider position and the piston position and the delivery pressure) is systematically taken into account in the calculation of the setpoint trajectory. This has the advantage that a realizable trajectory can be calculated which is close to (or at) the limitation, for example the maximum possible adjustment speed. In addition, safety limits (for example with regard to the supply pressure) can be systematically described and adhered to by means of state limitations. Another significant advantage is the ability to influence how hard or soft the trajectory is planned in the state limitations. For example, hard stops can be avoided, which, depending on the application, can significantly reduce component wear (for example of valves). Furthermore, it is advantageous that the limited trajectory (with sufficiently exact pilot control) provides realistic information about the current system state. This information can be used, for example, for higher-level diagnostic functions, as long as it is ensured that the axial piston machine is working without faults. The real-time computing effort of the pilot control concept used is very low and comes in particular without numerical real-time optimization.

The described approach is generally suitable for mobile working machines, in particular with the need for a combination of pressure control and pivot angle control for the pump. These include wheel loaders, telehandlers, municipal vehicles, and forklifts. It also applies, however, to closed-loop slewing gear drives and winch drives for cranes, ships and off-road vehicles.

A computing unit according to the disclosure, for example a control unit of a valve, is set up, in particular programmatically, to carry out a method according to the disclosure.

The implementation of the method in the form of a computer program is also advantageous, as this results in particularly low costs, especially if an implementing control device is still used for other tasks and is therefore available anyway. Suitable data carriers for the provision of the computer program are in particular magnetic, optical and electrical memories, such as hard drives, flash memory, EEPROMs, DVDs and so on. It is also possible to download a program via computer networks (Internet, intranet, etc.).

Further advantages and embodiments of the disclosure result from the description and the enclosed drawing.

It is understood that the features mentioned above and those to be explained below can be used not only in the respective combination indicated, but also in other combinations or on their own, without departing from the scope of the disclosure.

The disclosure is schematically represented on the basis of an exemplary embodiment in the drawing and is described in detail below with reference to the drawing.

DETAILED DESCRIPTION

The disclosure describes a general approach to real-time trajectory planning taking into account control variable and state variable limitations for nonlinear single-variable systems of any order. This new approach is particularly suitable for hydraulic systems and is used as an example for the control of a pivoting plate axial piston machine (AKM) with pressure control of the pivot angle.

Figure 1:
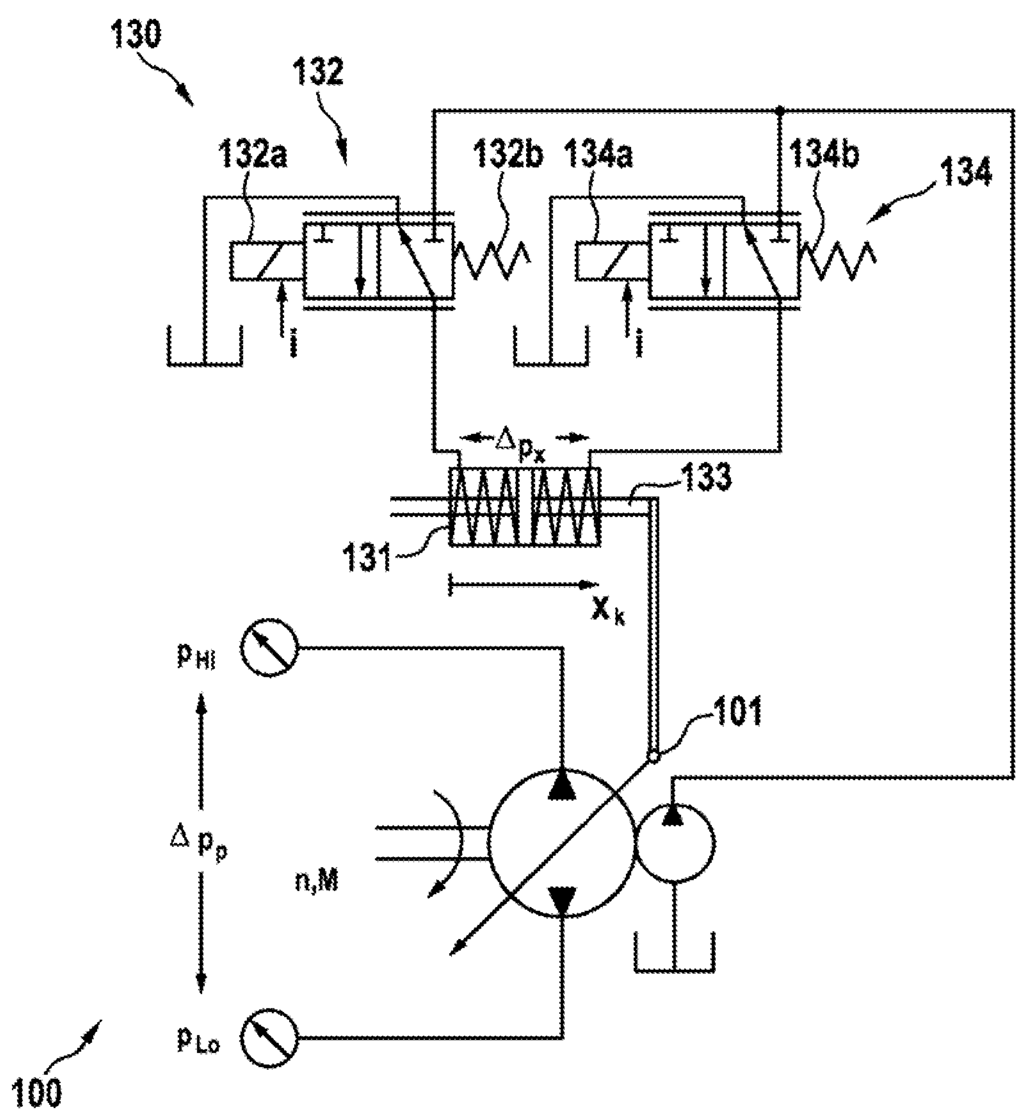
FIG. 1 shows schematically an axial piston machine with which a method according to the disclosure can be carried out.

In FIG. 1, an axial piston machine 100, for example of a pivoting plate or bent axis design, with an adjustment device 130 is shown schematically. A pivot angle of the axial piston machine is adjustable by means of the adjustment device 130, wherein the conveying volume or volumetric displacement can be adjusted by adjusting the pivot angle. The axial piston machine 100 can be operated both as a motor and as a pump with a revolution rate n and a torque M. The axial piston machine is connected to a high pressure side $p_{Hi}$ and a low pressure side $p_{Lo}$ and is subjected to a pressure difference $\Delta p_p$. In an implementation as a pump, the pressure difference $\Delta p_p$ represents the delivery pressure and an output variable of the pump.

The pivot angle can be adjusted by means of the adjustment device 130. The adjustment device 130 here comprises an adjustment cylinder 131, which engages with its piston 133 at a swivel cradle 101 of the axial piston machine 100, for example. A position of the piston is denoted with $x_K$. The piston is subjected to a pressure difference $\Delta p_x$, which can be adjusted by means of two electroproportional valves 132, 134. The position $x_K$ of the piston 133 in the adjustment cylinder 131 represents the output variable of the adjustment device 130.

The electroproportional valves 132, 134 each have a coil or an electromagnet 132*a*, 134*a*, which is supplied with a current i, and a restoring spring 132*b*, 134*b*, which are used to change a valve slider position.

The two pressure control valves 132, 134, which determine the adjustment cylinder position $x_k$, are conveniently considered as one valve. For this purpose, one valve is energized in such a way that no flow is generated, while the calculated control current I is switched to the other. A necessary conversion from one control current I to the two valves takes place outside the advanced state variable filter. In the following, therefore, a valve with a control current I is assumed. If the pressure control valves 132, 134 have a significantly faster dynamic than the adjustment cylinder, the valve slider position $x_v$ and the control current I are algebraically related as a function of the pressure difference $\Delta p_x$ via the valves by means of a static force balance (1).

$$F_m(I)+F_f(x_v)+F_{jet}(x_v;\Delta p_v)+F_p(\Delta p_v)=0 \quad (1)$$

where $F_m(I)$ is a magnetic force, $F_f(x_v)$ is a restoring spring force, $F_{jet}(x_v; \Delta p_v)$ is a flow force, and $Fp(\Delta p_v)$ is a pressure force. These forces can be applied, for example, by means of nonlinear functional relationships or characteristic fields as a function of the input variables. $\Delta p_v$ describes the pressure difference across the valves and is defined as follows:

$$\Delta p_v = \begin{cases} p_s - p_x, & x_v \geq 0 \\ p_x - p_t, & x_v < 0 \end{cases}, \quad (2)$$

wherein the control pressure $p_s \geq p_x$ and the tank pressure $p_t \leq p_x$ are constant pressures.

The control current I or the valve slider position $x_v$ determines the piston position $x_k$ via the following dynamic:

$$\dot{x}_k = \frac{1}{A_k} q_l(x_v, \Delta p_v) = \frac{1}{A_k}\sqrt{\frac{2}{\rho_c}}\,\alpha_v A_v(x_v)\sqrt{\Delta p_v}\,, \quad (3)$$

This dynamic depends on the cross-sectional area of the adjustment cylinder, $A_k$, as well as other constants $\alpha_v$, $\rho_v$. In addition, the pressure difference across the valves, $\Delta p_v$, has a direct influence on the first derivative of the adjustment cylinder position.

Due to the mechanical coupling, there is a bijective, algebraic relationship between the piston position $x_k$ and the pivot angle $\alpha_p$, which can be given, for example, by means of a nonlinear functional relationship or a characteristic field:

$$\alpha_p = f(x_k) bzw \cdot x_k = f^{-1}(\alpha_p) \quad (4)$$

Finally, the differential pressure across the pump results from the following dynamic:

$$\Delta \dot{p}_p = \frac{K}{V}(q_p(\alpha_p) - q_l(\Delta p_p)) = \frac{K}{V}(V_p \cdot \alpha_p \cdot \omega_p - q_l(\Delta p_p, \alpha_m, n_m)) \quad (5)$$

wherein K, V and Vp are constants, the angular velocity of the pump $\omega_p$ can be measured via the pump revolution rate or estimated by means of observers and $q_1(\Delta p_p)$ represents a load volumetric flow, which is a function, for example, of the differential pressure $\Delta p_p$. If the pump is used in a hydrostatic transmission, the load volumetric flow can also be a function of the pivot angle $\alpha_m$ or the revolution rate $n_m$ of a hydraulic motor.

In the case of axial piston pumps of a pivoting plate design, as for example represented in FIG. 1, the supply flow rate is adjusted by adjusting the pivot plate angle, in short the pivot angle. In the closed hydraulic system, the supply flow rate influences the differential pressure or delivery pressure $\Delta p_p$ via the pump. The pivot angle adjustment is carried out by means of a mechanical coupling of the pivot plate to a differential cylinder. Both chambers of the differential cylinder can be pressurized in this case. The chamber pressure is controlled by means of proportional directional valves with pressure recirculation.

Depending on the mechanical adjustment device and, if appropriate, the sensor configuration, various functions can be implemented for these pumps. An example is a speed control with mechanical pivot angle control (load-resistant operation). For this purpose, the pivot angle of the pivoting plate is mechanically returned to the proportional directional control valve by means of a spring and is thus kept within a control range. Another example is an electronic output pressure control (load-sensitive operation) without mechanical return of the pivot angle to the control valve. With the disclosure, even load-sensitive pumps can be used for load-resistant operation without the need for mechanical adaptations.

In one embodiment of the disclosure, for an output pressure-controlled axial piston pump of a pivoting plate design, an electronic four-quadrant control of the differential pressure taking into account a pivot angle limitation or a pivot angle control taking into account a differential pressure limitation can be realized here. In addition, a current limitation for the proportional directional valves can also be taken into account.

Figure 2:
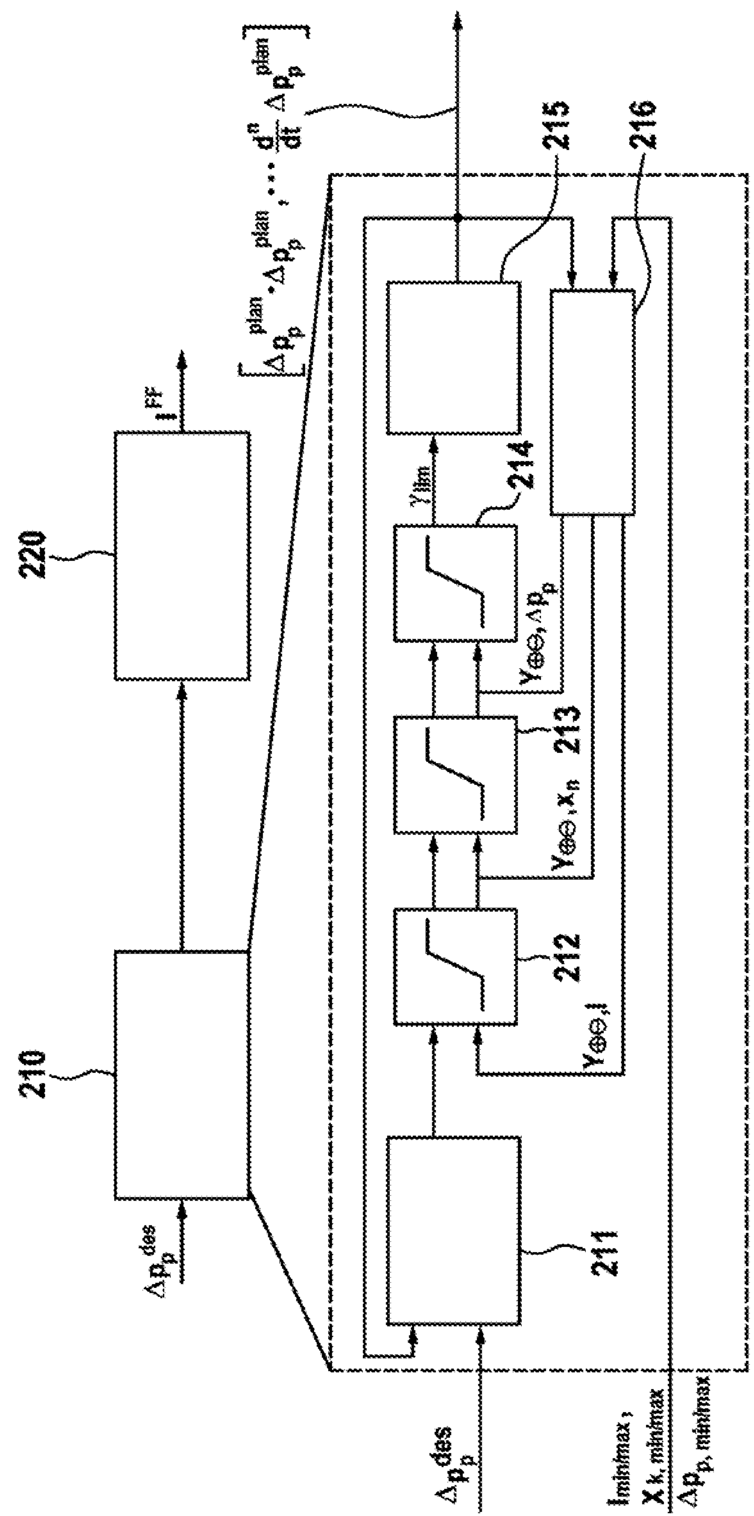
FIG. 2 shows a principle structure of the flatness-based pilot control in combination with the advanced trajectory filter for real-time control of hydraulic systems using the example of the control of the delivery pressure of an axial piston machine of a pivoting plate design.

In the embodiment of the disclosure in accordance with FIG. 2 this is achieved by means of an advanced trajectory filter or a state variable filter (eZVF) 210 for the differential pressure $\Delta p_p^{des}$ across the pump as a setpoint, the output of which contains a trajectory $\Delta p_p^{plan}$, which maintains the existing limitation, and the time derivatives of which are d/dt . . . $(d/dt)^n$. Compliance with the Limitations is carried out here by cascaded, model-based limitations 214, 213, 212 of the highest (here the second) derivative $z''_{ref}$, of the trajectory filter.

If limitations of the current I (212), pivot angle or piston position $x_k$ (213) or differential pressure $\Delta p_p$ (214) are reached, a differential pressure trajectory is obtained which complies with the limitations. The order of the limitations determines the priority of the corresponding limitations. If no limitation is reached, the differential pressure reference trajectory is filtered via an unlimited filter dynamic 211 which is adjustable by the user.

If the upper and lower limits follow the reference trajectory identically, this reference trajectory is implemented (as long as higher prioritizations do not override this). For example, a pivot angle control can be implemented taking into account a differential pressure limitation. The pivot angle reference trajectory is then specified as upper and lower limits for the pivot angle. These limitations will override the unlimited differential pressure planning and thus the specified pivot angle reference trajectory will be precisely implemented as long as the differential pressure limitation is not violated.

The valve slider position $x_v$ determines the adjustment cylinder position $x_k$. A nonlinear dynamic of the first order is assumed below here. In addition to the valve slider position, the pressure difference $\Delta p_x$ has a direct influence via the valves on the first derivative of the adjustment cylinder position.

Due to the mechanical coupling, there is a bijective, algebraic relationship between the adjustment cylinder position $x_k$ and the pivot angle $\alpha_p$, which can be given, for example, by a nonlinear function relationship or a characteristic field. Due to the mechanical coupling, it also applies to this relationship that a limitation of the adjustment cylinder position $x_k$ leads to a limitation of the pivot angle $\alpha_p$.

The pivot angle, the angular velocity of the pump, which can be measured by means of the pump revolution rate or estimated by observers, and a possible load volumetric flow determine, among other things, the differential pressure across the pump. Here, a nonlinear dynamic of the first order is assumed below. The load volumetric flow can depend, for example, on the differential pressure, but when used in a hydrostatic transmission can also depend on the pivot angle or the revolution rate of a hydraulic motor.

Based on this dynamic model, the eZVF 210 can be calculated. The model is flat in the real output $\Delta p_p$. Therefore, in the following, the real output $y=\Delta p_p$ is selected identically to the flat output.

Thus, there are no zero dynamics in the model.

However, it is also possible to use the disclosure if a stable zero dynamic is available. In this case, a stable differential equation must be solved to replan the setpoint from y to the flat output, see also Joos, S., Bitzer, M., Karrelmeyer, R., & Graichen, K. (2017). Online trajectory planning for state- and input-constrained linear SISO systems using a switched state variable filter. *IFAC-PapersOnLine,* 50(1), 2639-2644.

The simplified, non-linear model of the AKP is obtained using equations (3), (4) and (5) in flat coordinates:

$$\Delta\dot{p}_p = \frac{K}{V}\left(V_p \cdot \alpha_p \cdot \omega_p - q_l(\Delta p_p)\right) = \frac{K}{V}(V_p \cdot f(x_k) \cdot \omega_p - q_l(\Delta p_p)) \tag{6}$$

$$\begin{aligned}\Delta\ddot{p}_p &= \frac{K}{V}\left(V_p \cdot (\dot{\alpha}_p \cdot \omega_p + \alpha_p \cdot \dot{\omega}_p) - \dot{q}_l(\Delta p_p)\right) \\ &= \frac{K}{V}\left(V_p \cdot \left(\frac{\partial}{\partial x_k} f(x_k)\dot{x}_k \cdot \omega_p + \alpha_p \cdot \dot{\omega}_p\right) - \dot{q}_l(\Delta p_p)\right) \\ &= \frac{K}{V}\left(V_p \cdot \left(\frac{\partial}{\partial x_k} f(x_k) \cdot \frac{1}{A_k}\sqrt{\frac{2}{p_v}}\alpha_v A_v(x_v)\sqrt{\Delta p_v} \cdot \omega_p + \alpha_p \cdot \omega_p\right) - \right. \\ &\quad \left. \dot{q}_l(\Delta p_p)\right).\end{aligned}$$

The partial derivative $$\frac{\partial}{\partial x_k} f(x_k)$$

can be calculated either analytically or, in the presence of a characteristic field, numerically. The states of the system in flat coordinates are given by the vector $\Delta p_p=[\Delta p_p; \Delta\dot{p}_p]$. The model of the AKM in flat coordinates then consists of the dynamics of the differential pressure and the first time derivate of the differential pressure dynamics. This also requires the dynamics for the adjustment cylinder position.

A dynamic pilot control for the AKM can be specified directly from inversion of the model equations (6), (7) in flat coordinates. The trajectories $\Delta p_{ref}$, $\Delta\dot{p}_{ref}$, $\Delta p''_{ref}$ ($=z_{ref}$, $\dot{z}_{ref}$, $z''_{ref}$) can be generated with the help of a state variable filter (ZVF) 211, which can be implemented, for example, as a second-order delay element. The dynamics of the ZVF can be specified, for example, by means of a filter time constant.

In order to be able to comply with state variable and control variable limitations when controlling the AKM, these limitations must be taken into account in the planned trajectories. For this purpose, the ZVF is extended so that the input $\Delta p''_{ref}$ of the filter integrator chain 215 is dynamically limited. For each k-th limitation, a limit $\gamma_k$ is calculated in 216 and is applied to $\Delta p''_{ref}$ via a dynamic limitation element 212, 213, 214.

The integrator chain 215 has a number n of integrators to obtain the flat output from the limited (n) derivative $\gamma_{Lim}(t)$ (n is the order of the system) by n-times integration. This is the setpoint for the flat output $\Delta p_p^{plan}$ (and the time derivatives thereof), which are required, among other things, to realize the flat pilot control.

If there are limitations in the form of so-called box constraints for a control variable or a state, the limits $\gamma_k$ for the upper and lower limitations can be combined into a pair of limits $\gamma_{\oplus,k}$ and $\gamma_{\Theta,k}$). A box constraint exists when there is an upper and lower, possibly time-variant, limitation for each variable $x_i$, i.e. $x_{i,min} \le x_i \le x_{i,max}$ applies for all $x_i$. For the AKM, all limitations are in the form of box constraints, so that they can always be calculated in pairs in 216.

The limit for a flat system with system order n and state z and a box constraint limitation $f^T z - z_{i,Lim} \le 0$, wherein f is only for an element other than 0, is then:

$$\gamma_{lim} = \frac{r(\xi)}{f(\xi)} \cdot z_{\xi,lim} - [0, \ldots, 0, r(\xi), \ldots, r(n)]^T z,$$

Wherein r(ξ), . . . , r(n) represent tuning parameters. In order to determine the variable ξ from all states on which the limitation $f^T z - z_{i,Lim} \le 0$ depends directly, the one with a minimum relative degree must be determined. The variable ξ is then the index associated with this state. For a more detailed description, see Joos, S.; Bitzer, M.; Karrelmeyer, R.; Graichen, K.: Prioritization-based switched feedback control for linear SISO systems with time-varying state and input limitations. Proc. European Control Conference, p. 2935-2940, 2018, referred.

The order of the limitation elements determines the priority of the individual limitation. Typically, control variable limitations are prioritized the highest, i.e. the corresponding limitation element is placed last. Thus, the feasibility of the pilot control signal is ensured by the actuator.

To take into account (212) the limitations of the control current $I_{min} \le I \le I_{max}$, these are first represented with the help of the force balance (1) as limitations of the valve slider position, i.e. $I_{min}$ leads to an $x_{v;min}$ and $I_{max}$ to an $x_{v;max}$. If no analytical resolution of the force balance (1) according to $x_v$ is possible, this can be done for example by means of a zero point search. The dynamic limits $\gamma_{\oplus,I}$ and $\gamma_{\Theta,I}$ for taking into account the control variable limitation result from the insertion of $x_v=x_{v;min/max}$ into the highest derivative.

$$\begin{aligned}&\Upsilon\ominus, I(\Delta p_p, x_{v,min})) = \\ &\frac{K}{V}\left(V_p \cdot \left(\frac{\partial}{\partial x_k} f(x_k) \cdot \frac{1}{A_k}\sqrt{\frac{2}{\rho_v}}\alpha_v A_x(x_{v,min})\sqrt{\Delta p_r} \cdot \omega_p + f(x_k) \cdot \dot{\omega}_p\right) - \right. \\ &\left. \dot{q}_l(\Delta p_p)\right)\end{aligned} \tag{8}$$

$$\begin{aligned}&\Upsilon\oplus, I(\Delta p_p, x_{v,max})) = \\ &\frac{K}{V}\left(V_p \cdot \left(\frac{\partial}{\partial x_k} f(x_k) \cdot \frac{1}{A_k}\sqrt{\frac{2}{\rho_v}}\alpha_v A_v(x_{v,max})\sqrt{\Delta p_v} \cdot \omega_p + f(x_k) \cdot \dot{\omega}_p\right) - \right. \\ &\left. \dot{q}_l(\Delta p_p)\right).\end{aligned} \tag{9}$$

The required piston position $X_k$ is obtained by resolving from (6) to $\alpha_p$ and using (4) to $$x_k = f^{-1}(\alpha_p) = f^{-1}\left(\frac{1}{V_p \cdot \omega_p} \cdot \left(q_l(p_p) + \frac{V}{K}\Delta\dot{p}_p\right)\right). \tag{10}$$

The dynamic limits γ⊕, xk; γθ, xk for taking into account (213) the geometric limitation of the adjustment cylinder position $x_{k;min} \leq x_k \leq x_{k;max}$ result from the first derivative of the flat output, i.e. ξ=2 and (6) to $$\dot{p}_{p,min}(x_{k,min}) = \frac{K}{V}(V_p \cdot f(x_{k,min}) \cdot \omega_p - q_l(\Delta p_p)) \tag{11}$$

$$\dot{p}_{p,max}(x_{k,max}) = \frac{K}{V}(V_p \cdot f(x_{k,max}) \cdot \omega_p - q_l(\Delta p_p)). \tag{12}$$

The functions for limiting the highest derivative, in this case z", are then:

$$\gamma\theta,x_k(\Delta p_p,x_{k,min})=r\theta,x_k\cdot(\Delta\dot{p}_{p,min}(x_{k,min})-\Delta\dot{p}_p) \tag{13}$$

$$\gamma\oplus,x_k(\Delta p_p,x_{k,max})=r\oplus,x_k\cdot(\Delta\dot{p}_{p,max}(x_{k,max})-\Delta\dot{p}_p). \tag{14}$$

Thus, there is one tuning parameter each, r⊕, $x_k$ and rθ, $x_k$. These influence how hard the trajectory is planned in the stop and are to be adjusted pump-specifically depending on the available control variable reserve.

In addition, the differential pressure across the pump should be limited (214) to the interval $\Delta p_{p;min} \leq \Delta p_p \leq \Delta p_{p;max}$. Here ξ=1 and thus γθ, , Δpp and γ⊕, , Δpp each depend on a parameter vector rθ, , Δp=[rθ, , Δpp(1); rθ, , Δpp(2)] or r⊕, , Δp=[r⊕, , Δpp(1); r⊕, , Δpp(2)]. The functions for complying with this limitation result from:

$$\gamma\theta,\Delta p_p(\Delta p_p,\Delta p_{p,min})=r\theta,\Delta p_p(1)\cdot(\Delta p_{p,min}-\Delta p_p)-r\theta,\Delta p_p(2)\cdot\Delta\dot{p}_p \tag{15}$$

$$\gamma\oplus,\Delta p_p(\Delta p_p,\Delta p_{p,max})=r\oplus,\Delta p_p(1)\cdot(\Delta p_{p,max}-\Delta p_p)-r\oplus,\Delta p_p(2)\cdot\Delta\dot{p}_p \tag{16}$$

For this please refer to Joos, S.; Bitzer, M.; Karrelmeyer, R.; Graichen, K.: Prioritization-based switched feedback control for linear SISO systems with time-varying state and input limitations. In: Proceedings European Control Conference, Limassol, Cyprus, 2018, p. 2935-2940, referred.

The resulting limits thus correspond to a second-order integrator chain, the state of which $[\Delta p_{p,max}-\Delta p_p, \Delta\dot{p}_p]$ or $[\Delta p_{p,min}-\Delta p_p, \Delta\dot{p}_p]$ is stabilized by means of the tuning parameters. The faster/slower the poles and thus the tuning parameters $[r,_{\Delta pp}(1); r,_{\Delta pp}(2)]$ are selected for calculation in 216, the later/earlier and the stronger/weaker the system is pulled to the differential pressure limitation. The tuning parameters are to be set pump-specifically depending on the available control variable reserve.

A flatness-based pilot control 220 determines a setpoint $I^{FF}$ for the valve current from the setpoint $\Delta p_p$ for the feed pressure or pump pressure. This is based on a dynamic system model with a control current as input and a differential pressure as output.

Figure 3:
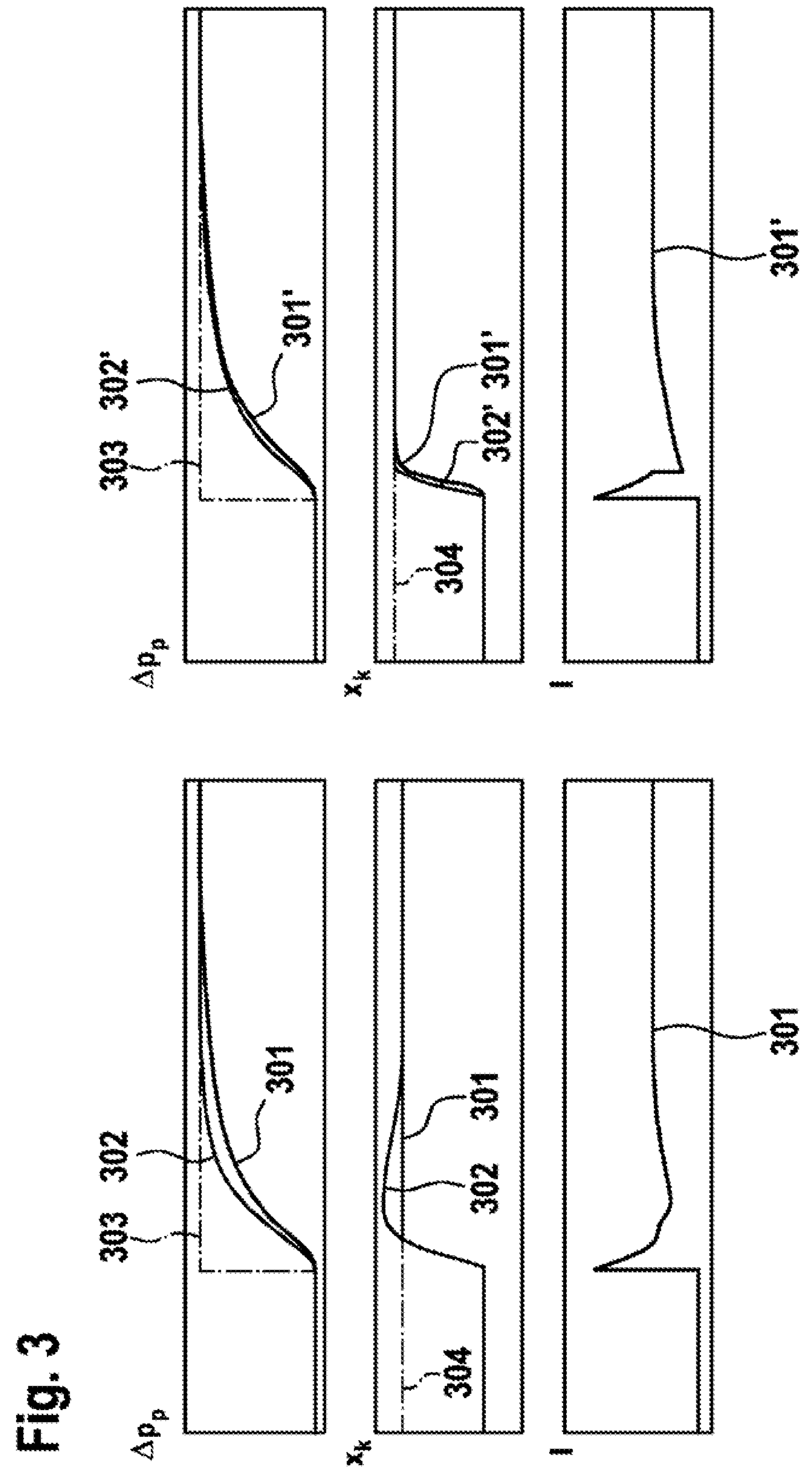
FIG. 3 shows a qualitative comparison of different trajectories for the variable to be controlled, an internal limited system state and the control variable.

The qualitative profile of the limited control and the associated behavior of the controlled AKM compared to the behavior thereof with unlimited control are shown in FIG. 3. FIG. 3 shows a qualitative comparison of different trajectories for the variable differential pressure $\Delta p_p$ to be controlled, an internal limited system state pivot angle or piston position $x_k$ as well as the control variable current I.

If an AKM on the basis of the unlimited reference trajectory 303 is controlled by the prior art according to a setpoint trajectory 302 generated or planned in a non-inventive manner, see left figure, then for each differential pressure, Δpp and piston position, $x_k$ the profile 301 is measured on the system. The system cannot follow the planned trajectory 302 precisely due to the limitation 304 of the piston position which is not taken into account.

In comparison, the control trajectory 302' replanned by the disclosure, see right picture, can be realized by the system, i.e. the planned trajectory 302' and the actual trajectory 301' are almost exactly coincident.

The invention claimed is:

1. A method for generating a setpoint trajectory which satisfies predetermined limitations for a hydraulic machine with an actuator for influencing an output variable of the hydraulic machine, the method comprising:

supplying a trajectory of unlimited setpoints to a trajectory planning function implemented by a computing unit, the trajectory planning function generates the setpoint trajectory from the trajectory of unlimited setpoints;

differentiating, in the trajectory planning function using the computing unit, the trajectory of unlimited setpoints at least n times in order to obtain a first derivative differentiated trajectory of unlimited setpoints corresponding a first derivative of the trajectory planning function, and a second derivative differentiated trajectory of unlimited setpoints corresponding to a second derivative of the trajectory planning function, wherein n≥2;

applying, in the trajectory planning function using the computing unit, at least one first limitation to the first derivative differentiated trajectory of unlimited setpoints in order to obtain a first differentiated trajectory of limited setpoints;

applying, in the trajectory planning function using the computing unit, at least one second limitation to the second derivative differentiated trajectory of unlimited setpoints in order to obtain a second differentiated trajectory of limited setpoints, the at least one second limitation different from the at least one first limitation;

integrating the first and the second differentiated trajectories of limited setpoints using a filter integrator chain to obtain the setpoint trajectory using the computing unit; and operating the actuator based on the setpoint trajectory which satisfies the predetermined limitations of the hydraulic machine, the actuator operably connected to the computing unit.

2. The method as claimed in claim 1, wherein the at least one first limitation and the at least one second limitation include control variable limitations of the actuator.

3. The method as claimed in claim 2, wherein the actuator comprises an electrically controllable valve.

4. The method as claimed in claim 3, wherein the control variable limitations include a magnetic force limitation or a control current limitation of the electrically controllable valve to a value between a minimum value and a maximum value.

5. The method as claimed in claim 3, wherein the at least one first limitation and the at least one second limitation further include a limitation of a valve slider position to a value between a minimum value and a maximum value depending on a control range of the actuator.

6. The method as claimed in claim 1, wherein the at least one first limitation and the at least one second limitation include limitations as a function of a control range of the actuator.

7. The method as claimed in claim 6, wherein:

the hydraulic machine is a pivoting plate or bent axis machine, and the at least one first limitation and the at least one second limitation further include a limitation of a pivot angle to a value between a minimum value and a maximum value depending on a control range of the actuator.

8. The method as claimed in claim 6, wherein the at least one first limitation and the at least one second limitation further include a limitation to a value between a minimum value and a maximum value depending on the control range of the actuator.

9. The method as claimed in claim 8, wherein a setpoint is specified as the minimum value and the maximum value.

10. The method as claimed in claim 1, wherein the at least one first limitation and the at least one second limitation further include a limitation of the setpoint.

11. The method as claimed in claim 1, wherein the actuator comprises a hydraulic adjustment cylinder with a movable piston.

12. The method as claimed in claim 1, wherein:

the at least one first limitation and the at least one second limitation further include a lower limit and/or an upper limit, and the upper limit is preferably different from the lower limit.

13. The method as claimed in claim 1, further comprising:

supplying the setpoint trajectory to a flatness-based pilot control, which produces therefrom a control variable trajectory for the actuator.

14. The method as claimed in claim 1, wherein the hydraulic machine is a pump and the setpoint is a delivery pressure of the pump.

15. The method as claimed in claim 1, wherein a computer program causes the computing unit to carry out the method when the computer program is executed on the computing unit.

16. The method as claimed in claim 15, wherein the computer program is stored on a non-transitory machine-readable memory medium.

17. The method as claimed in claim 1, wherein the hydraulic machine is guided as quickly as possible along the setpoint trajectory while complying with the at least one first limitation and the at least one second limitation.

18. The method as claimed in claim 1, wherein the computing unit obtains the setpoint trajectory in real time.

* * * * *